3,845,227
METHOD OF PRODUCING CORNED BEEF
Gary W. Shults, Milford, and Eugen Wierbicki, Framingham, Mass., assignors to the United States of America as represented by the Secretary of the Army
No Drawing. Filed Oct. 3, 1972, Ser. No. 294,758
Int. Cl. A22b 1/02; A22c 18/00
U.S. Cl. 426—266   6 Claims

ABSTRACT OF THE DISCLOSURE

Method of producing corned beef which is capable of being dry roasted or reheated by any conventional method to produce an acceptable cooked corned beef product and which can be stored for long periods of time at room temperature or higher temperatures. The whole carcass or a major portion thereof is deboned and most of the fat is removed. The lean meat is then cut into chunks, mixed with a curing brine, stuffed into flexible film casing, heat treated to inactivate enzymes therein, hermetically sealed in cans or other containers, and sterilized with high energy ionizing radiation at a low temperature, e.g. about −25° ±20° C.

---

The invention described herein may be manufactured, used and licensed by or for the Government for governmental purposes without the payment to us of any royalty thereon.

BACKGROUND OF THE INVENTION

This invention relates to a process for producing corned beef which is capable of being cooked with dry heat to produce a tender cooked corned beef product which is tasty and has excellent textural characteristics.

Corned beef is conventionally produced from the brisket portion of a beef carcass, which is very tough and, therefore, normally requires lengthy boiling in water or steam cooking to break down the connecting tissues therein sufficiently to make the brisket tender enough to be edible. Over a period of many years, it has become customary to treat the brisket with curing salt mixtures comprising the common salt, sodium chloride, and nitrates and nitrites, such as sodium nitrate and sodium nitrite, to develop the characteristic pink color of corned beef.

When corned beef brisket is to be used within a few weeks time, it may be packaged in a flexible film container and held under refrigeration. However, for prolonged storage at room temperature or higher temperatures, it has been found necessary to sterilize the corned beef as well as other beef products. It has been found that sterilization of canned beef products can be accomplished by heating at high temperatures under pressure or by irradiation with high energy ionizing radiation. The latter procedure can be carried out at relatively low temperatures of irradiation without the production of undesirable off-flavors in the beef. However, for high energy ionizing radiation sterilization to be used, the meat should be of relatively uniform cross-sectional dimensions in order to obtain a uniform irradiation dose. This is difficult to attain with beef brisket and results in a very expensive finished product which still requires boiling for a long period or steam cooking to tenderize the beef brisket.

For a long time there has been a desire for a precooked corned beef product which would be adaptable to dry roasting much like certain relatively tender cuts of the beef carcass, such as the rib or the sirloin, or reheating by any conventional method, and particularly such corned beef product which would be adapted to canning and sterilization with high energy ionizing radiation so that it would remain safe over long periods of time at room temperature or even higher temperatures. Normally, dry heat tends to dry out meat being cooked therewith. If very tough cuts of meat are cooked therewith, they tend to dry out to such a degree that they end up as very tough, hard, leather-like products which are not suitable for eating before the connecting tissues are broken down. This is why the brisket of beef, of which corned beef is conventionally prepared, traditionally has been cooked by boiling for long periods of time. The water in which it is cooked prevents drying out of the brisket and assists in breaking down the connective tissues of the brisket at the elevated temperatures of boiling water or steam.

GENERAL DESCRIPTION OF THE INVENTION

We have discovered that the long sought result of preparing corned beef which can be dry roasted to produce a cooked corned beef product which is neither dry nor tough and which is very acceptable, retaining the characteristic flavor and appearance of corned beef, can be accomplished by a procedure to be described below.

An object of the invention, therefore, is to provide a process for producing corned beef which is capable of being dry roasted to produce an acceptable cooked corned beef product compatible to sterilization by ionizing radiation.

Another object is to provide a process for producing corned beef which is enzyme-inactivated and sterilized by means of high energy ionizing radiation and which is capable, after long-term storage at room temperature or higher temperatures, of being dry roasted to produce an acceptable cooked corned beef product.

Other objects and advantages of the invention will become apparent as the description of the invention proceeds.

The above-stated objects of the invention are accomplished by a procedure which, to the best of our knowledge, has not heretofore been applied to the production of corned beef, although modifications of various steps therein have been employed from time to time in processing meat products for other purposes than for producing corned beef. The process is not limited to any single cut of beef, such as the brisket as in the case of conventionally processed corned beef, but rather is applicable to a variety of cuts or portions of beef carcasses. In fact, the whole carcass, less the viscera, in other words the muscle portions of the beef, may be deboned and processed in accordance with the invention to produce an economical and very acceptable corned beef product. Alternatively, the better or more expensive cuts of beef, such as steaks and the naturally more tender roasts, may be removed and the process may then be applied to the remaining muscle portions of the beef carcass.

The process involves cutting the lean muscle meat from a portion or the whole carcass of beef, after deboning thereof and removal of the fat therefrom other than the marbling streaks of fat, into chunks or pieces weighing from about one-fourth pound to about three pounds. The chunks or pieces of lean beef are mixed with approximately 15 percent by weight of a curing brine, so as to provide a ratio of about 0.15 pound of curing brine solution per pound of beef, comprising, in addition to sodium chloride, sodium nitrate, sodium nitrite, edible phosphate (e.g. sodium tripolyphosphate), ascorbate or ascorbic acid, erythorbate, and spices to impart a desirable spicy flavor to the beef. The mixing is carried out for a sufficient length of time to distribute the curing brine thoroughly over the surface areas of the beef pieces or chunks, usually about 5 to 10 minutes being required. The pieces or chunks of beef are somewhat tacky after the mixing due to working of the lean beef in the presence of the phosphate. The tacky pieces of beef are first stuffed into flexible film containers, such as regenerated cellulose film casings, and held for about 12 to about 24 hours at about 2° to 5° C. to permit the curing compounds to act on the beef muscle thoroughly. After this holding period, the beef is heated in water at about 90° to 100° C. for about 75 to about 100 minutes in the case of about 4-inch diameter rolls of beef to inactivate the enzymes therein prior to canning or otherwise hermetically packaging in second containers and sterilizing of the beef with high energy ionizing radiation. If desired, the enzymes may be inactivated by means of dry heating as in a smokehouse without exposing the beef to smoke.

The beef may alternatively be sterilized by thermal processing at a sufficiently high temperature and for a sufficient length of time to destroy substantially all microorganisms therein. However, for the purposes of producing corned beef which may be dry roasted and which will retain relatively high acceptability, it is preferred to sterilize the beef in hermetically sealed cans, preferably at a relatively low temperature, e.g. $-25° \pm 20°$ C., to avoid the formation of off-flavors and off-odors, with high energy ionizing radiation at a dosage sufficient to destroy most, if not all, of the microorganisms therein, generally speaking at from about 2.0 to about 6.0 megarads and at an energy level of from about 750,000 to about 10,000,000 electron volts.

The curing brine which is mixed with the pieces or chunks of beef, as described above, and in which the mixture of beef with brine encased in flexible regenerated cellulose film material is soaked, is prepared as described below. 100 grams of pickling spieces (coriander, mustard seeds, fenugreek, bay leaves, caraway, turmeric, and red peppers) are boiled in 2700 grams of water for 15 minutes and then separated from the aqueous extract. The aqueous spiece extract is mixed with about 8,650 grams of water, about 1815 grams of sodium chloride, about 380 grams of sodium tripolyphosphate, about 50 grams of sodium nitrate, about 20 grams of sodium nitrite, about 25 grams of sodium ascorbate, or ascorbic acid, and about 25 grams of sodium erythorbate. The sodium chloride content may vary from about 0.5% to about 4% in the finished product depending on the consumers' demands; we have found the best acceptance for corned beef containing about 2% sodium chloride. Concentrations of edible food grade phosphates may vary from about 0.3% to about 0.5%, although lower concentrations can be used. Sodium nitrite and sodium nitrate may vary from about 10% to about 100% of the amounts allowed by the U.S.D.A. regulations. U.S.D.A. regulations allow a maximum of 500 parts per million of nitrate and 200 parts per million of nitrite in the final product. The use of ascorbates and/or erythorbates in the maximum quantities allowed by the U.S.D.A. regulations is recommended for preserving the pink cured meat color of the product.

The radiation sterilized corned beef may be removed from the cans and dry roasted at an oven temperature of about 300° F. over a period of about 1 to 2 hours or until it attains an internal temperature of about 145° F. in the case of an approximately 4-inch diameter corned beef roll, or served cold, for acceptable corned beef entrée or a very desirable product for slicing and incorporating in corned beef sandwiches, salads, or other dishes.

PREFERRED EMBODIMENT OF THE INVENTION

We will now proceed to disclose an example illustrating an embodiment of our invention which is our preferred method of preparing corned beef which is suitable for cooking by dry roasting. It will be understood, of course, that this example is only illustrative and is not to be taken as limitative of the invention.

EXAMPLE I

The hind quarter of a beef carcass was deboned and freed of substantially all surface and intermuscular fats, no effort being made to remove streaks of marbling fat therefrom. The beef was then cut up into chunks or pieces of substantially all lean meat weighing from about one-half pound to about one pound.

An aqueous spice extract was prepared by heating a mixture of about 2700 grams of water with about 100 grams of granulated or whole pickling spices including coriander, mustard seeds, fenugreek, bay leaves, caraway, turmeric, and red chili peppers for about 15 minutes, then separating the solid spices from the aqueous extract. The aqueous spice extract was mixed with 8,650 grams of water, 1814 grams of sodium chloride, 378 grams of sodium tripolyphosphate, 48 grams of sodium nitrate, 18 grams of sodium nitrite, 25 grams of sodium ascorbate, and 25 grams of sodium erythorbate to produce a curing brine.

The beef pieces or chunks were placed in a mechanical mixer along with a quantity of the above-described curing brine equivalent to about 15 percent of the weight of the beef chunks or pieces and mixed therein for about 6 minutes at room temperature to assure thorough distribution of the curing brine over all exposed surfaces of the pieces of beef and considerable absorption and working into the beef of the curing brine. The beef, which was somewhat tacky after mixing, was then stuffed into a fibrous regenerated cellulose casing of such internal dimensions as to produce beef roll of about 4 inches diameter. The beef roll was then soaked in a sufficient quantity of the curing brine to completely cover the beef roll for about 24 hours at room temperature to permit the thorough curing of the beef. The beef roll was then subjected to heating in water at about 90° C. for about 80 minutes, primarily to accomplish inactivation of the enzymes in the beef. This step is necessary when the meat is to be sterilized at low temperature with ionizing radiation and stored for substantial periods of time at or above room temperature since any enzymes remaining active in the meat will continue to act upon the meat despite the sterilization with ionizing radiation.

The enzyme-inactivated corned beef roll was cut into suitable lengths and placed in cans of slightly greater internal diameter than the rolls and the substantially filled cans were hermetically sealed. The cans of corned beef roll were subjected to ionizing radiation at about $-25° \pm 20°$ C. and an energy level of about 1,280,000 electron volts until they had received about 2.5 megarads of radiation from a Cobalt 60 source.

The above-described corned beef roll was compared with brisket of beef prepared in a conventional manner wherein it was boiled and simmered in water for about 3 hours to tenderize it after it had been pumped and allowed to soak in a curing brine of substantially the same composition as that employed in curing the above-described chunks of beef from the whole quarter of beef, the soaking being allowed to continue for about 48 hours.

The comparison of the corned beef roll prepared in accrdance with the invention and the brisket of beef prepared as described above was made by a technological panel of seven members who were experienced in the evaluation of meat products. The first comparison was made within less than 72 hours after the irradiation of the corned beef roll. A second comparison was made after storage of the radiation sterilized canned corned beef roll for one month at two different temperatures (21° C. and 38° C.). A third comparison was made after storage of the radiation sterilized canned corned beef roll for three months at the same two different temperatures as in the one-month storage test.

In the comparisons, two different types of scoring were employed. The "Preference" test was based on a "Hedonic Scale" type of scoring which has been widely used in acceptance testing or preference testing of food products. In this test a scale from 1 to 9 is employed, the value of the number assigned to a sample representing relative acceptability or preference for the food as judged by a given panelist, the figure given in Table 1 below being the average for the seven panel members' evaluations. An average value of 5 would indicate borderline acceptability. Higher numbers than 5 would indicate greatetr degrees of acceptability up to 9, which represents "like extremely," while lower numbers than 5 would indicate lesser degrees of acceptability down to 1, which represents "dislike extremely."

The other type of scoring is a "Sensory Characteristics" evaluation which employs a nine point intensity scale, much as in the "Dedonic Scale" but in a substantially reversed relationship in that the lower the number given to a food product in connection with a given sensory characteristic test, the more desirable the product from that standpoint. Six different sensory characteristics of the corned beef products tested were evaluated in accordance with this test.

The results of the comparisons of the corned beef roll prepared in accordance with the invention and the brisket of beef prepared in the conventional manner as described above are given in Table 1 below:

palatable unless it was subjected to lengthy boiling in water or steaming for at least about three hours at some time during its processing.

It is to be understood that other curing brine compositions may be employed in curing the beef employed in producing corned beef in accordance with the invention. It is generally desirable that the curing brine contain sufficient phosphate to make the chunks of beef tacky enough to cause them to adhere one to another and thus produce a corned beef roll which slices well and holds together in the sliced form while still being tender enough to be quite acceptable. Various other edible phosphates may be used other than sodium tripolyphosphate, such as tetrasodium pyrophosphate, sodium hexametaphosphate, or mixtures of any or all of the phosphates mentioned above. Similarly, other curing temperatures and times may be

TABLE 1

| Sample | Storage temp. and time | Preference (Hedonic scale) | Discoloration | Off Odor | Off Flavor | Irradiation, flavor | Mushiness | Friability |
|---|---|---|---|---|---|---|---|---|
| Roll | Not stored | 6.28 | 1.85 | 2.00 | 1.71 | 1.57 | 1.71 | 2.00 |
| Brisket control | do | 6.57 | 1.71 | 1.28 | 1.14 | 1.00 | 1.00 | 1.71 |
| Roll | 21° C., 1 mo | 5.78 | 2.71 | 1.71 | 1.85 | 2.28 | 1.14 | 2.14 |
| Do | 38° C., 1 mo | 6.35 | 2.28 | 1.57 | 1.42 | 1.42 | 1.85 | 2.28 |
| Brisket control | Stored frozen | 7.14 | 1.14 | 1.14 | 1.42 | 1.14 | 1.00 | 1.42 |
| Roll | 21° C., 3 mo | 5.92 | 2.71 | 2.57 | 2.00 | 2.00 | 1.42 | 1.71 |
| Do | 38° C., 3 mo | 6.42 | 1.42 | 1.71 | 1.57 | 1.57 | 1.28 | 2.28 |
| Brisket control | Stored frozen | 7.07 | 1.28 | 1.57 | 1.14 | 1.00 | 1.00 | 1.00 |

It is seen that the corned beef roll prepared in accordance with the invention compared quite favorably with frozen brisket of beef prepared in accordance with conventional practices for preparing corned beef by prolonged boiling to tenderize it. And even after storage of the radiation sterilized corned beef roll for as long as 3 months at 21° C. (about room temperature) and 38° C. (about 100° F.) it was quite acceptable, well above the borderline of acceptability on the "Hedonic Scale."

In addition to the above comparisons, corned beef was prepared from the brisket portion of the beef by curing and sterilizing by irradiation in the same manner as the roll in Table 1. However, it was cooked by boiling in water for three hours. It was also subjected to preference testing and sensory characteristics testing by the same technological panel. The results immediately after irradiation were closely comparable to those for the roll, the irradiated brisket being given a preference rating of 6.42. However, after one month storage, the irradiated brisket preference rating had dropped to 5.50 when stored at 21° C. and 6.00 when stored at 38° C.; and after three months storage, the preference rating for the irradiated brisket was 5.71 after storage at 21° C. and 5.78 after storage at 38° C. It is, therefore, apparent that the corned beef roll prepared in accordance with the invention is more acceptable than beef brisket which has been treated similarly except for the lengthy boiling in water of the brisket according to conventional practices for cooking corned beef, and it is furthermore apparent that the irradiated corned beef roll which has been cooked only a relatively short time in comparison with conventional corned beef is very close in acceptability or preference to brisket corned beef, prepared conventionally, which has not been irradiated but rather has been maintained in the frozen state until time for comparison testing.

It has furthermore been found that the corned beef roll prepared in accordance with this example can be removed from its container at any time up to three months or even longer after radiation sterilization thereof and dry roasted in an oven. When so treated, it has been found to be at least as acceptable as the corned beef rolls shown in Table 1 for the same storage times and temperatures. On the other hand, the brisket of beef was found to be unsuitable for dry roasting or dry heat treatment in a smokehouse or otherwise since it remained tough and unemployed and other types of flexible film containers may be used for producing the corned beef in roll form.

It is also to be understood that the inactivation of enzymes in the beef and/or the final cooking of the corned beef roll may be carried out by other means than those disclosed above; for example, microwave heating may be employed for either or both of these purposes. Inactivation of the enzymes in the corned beef roll prior to radiation sterilization may also be accomplished by applying dry heat in a smokehouse (generally without exposing the roll to smoke).

The process of the invention has the advantage over prior processes of producing corned beef in that the corned beef roll product is adaptable to dry roasting which tends to hold in the natural flavor constituents of the beef in contrast to boiling or steam cooking, which tend to leach out the natural flavor constituents of the beef. On the other hand, conventional brisket corned beef is not adapted to dryroasting since it would be too tough to be acceptable. A further advantage of the process of the invention is economic. Corned beef produced in accordance with the invention has been found to cost less per pound of finished corned beef than the brisket type corned beef of the prior art while being equally as acceptable and in many cases more acceptable than conventional brisket corned beef.

We wish it to be understood that we do not desire to be limited to the exact details described, for obvious modifications will occur to a person skilled in the art.

We claim:

1. A process for producing precooked corned beef which is capable of being further cooked or reheated with dry heat to produce a tender cooked corned beef product which comprises the steps of
   a. deboning a whole beef carcass or a portion of a beef carcass,
   b. subdividing the deboned beef carcass or portion thereof into pieces of beef of from about one-fourth pound to about three pounds each,
   c. mixing said pieces of beef in a mechanical mixer with an aqueous curing brine solution in the ratio of about 0.15 pound of curing brine solution per pound of beef, said curing brine solution being formed by extracting about 100 grams of solid pickling spices with about 2700 grams of water, separating the aqueous extract from the solid pickling spices, mixing the aqueous extract with about 8,650 grams of additional water, about 1815 grams of sodium chloride, about 380 grams of edible phosphate, about 50 grams of sodium nitrate, about 20 grams of sodium nitrite, about 25 grams of sodium ascorbate or ascorbic acid, and about 25 grams of sodium erythorbate, said mixing of said beef and said curing brine solution being continued until said beef is tacky, d. stuffing the mixture of beef and curing brine into a flexible film container, e. holding said mixture of beef and curing brine in said flexible film container for about 12 to about 24 hours at from about 2° C. to about room temperature to accomplish thorough curing of said beef by said curing brine, and f. inactivating the enzymes in said beef by heat treatment of said beef in said flexible film container at a temperature and for a time sufficient to accomplish inactivation of said enzymes.

2. A process according to claim 1, wherein after said step of inactivating the enzymes in said beef, said beef is hermetically sealed in a second container and sterilized while remaining in said second container by irradiation thereof at a temperature of about —25°±20° C. with high energy ionizing radiation at a sufficient dosage to destroy substantially all microorganisms in said beef.

3. A process according to claim 2, wherein said beef in said second container is sterilized by irradiation thereof with high energy ionizing radiation at a dosage of from about 2.0 to about 6.0 megarads.

4. A process according to claim 3, wherein said high energy ionizing radiation has an energy level from about 750,000 electron volts to about 10,000,000 electron volts.

5. A process according to claim 1, wherein said edible phosphate is selected from the group consisting of sodium tripolyphosphate, tetrasodium pyrophosphate, sodium hexametaphosphate, and mixtures thereof.

6. A process according to claim 1, wherein said step of inactivating the enzymes in said beef by heat treatment is carried out by heating said beef in water at about 90° C. to about 100° C. for about 75 to about 100 minutes.

References Cited
UNITED STATES PATENTS

| | | | |
|---|---|---|---|
| 2,456,909 | 12/1948 | Brasch | 99—107 X |
| 3,076,713 | 2/1963 | Maas | 99—107 |
| 3,401,044 | 9/1968 | Corlett et al. | 99—159 X |

HYMAN LORD, Primary Examiner

U.S. Cl. X.R.

426—272